United States Patent
Attar et al.

(10) Patent No.: US 9,058,576 B2
(45) Date of Patent: *Jun. 16, 2015

(54) MULTIPLE PROJECT AREAS IN A DEVELOPMENT ENVIRONMENT

(71) Applicant: INTERNATIONAL BUSINESS MACHINES CORPORATION, Armonk, NY (US)

(72) Inventors: Mohammed M. Attar, Placentia, CA (US); Thuy B. Do, Irvine, CA (US); Huzefa A. Hakim, Laguna Hills, CA (US); Wen-Chin Hsieh, Rolling Hills Estates, CA (US); Paul S. MacAlpine, Laguna Hills, CA (US); Lauren A. Mayes, Laguna Beach, CA (US); Raghuram Tadipatri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,277

(22) Filed: May 20, 2013

(65) Prior Publication Data

US 2013/0305211 A1 Nov. 14, 2013

Related U.S. Application Data

(63) Continuation of application No. 13/466,935, filed on May 8, 2012.

(51) Int. Cl.
*G06F 9/44* (2006.01)
*G06Q 10/06* (2012.01)
*G06F 11/36* (2006.01)

(52) U.S. Cl.
CPC ............ *G06Q 10/06* (2013.01); *G06F 11/3664* (2013.01)

(58) Field of Classification Search
None
See application file for complete search history.

(56) References Cited

U.S. PATENT DOCUMENTS

| 5,651,111 A | 7/1997 | McKeeman et al. |
| 7,810,067 B2 | 10/2010 | Kaelicke et al. |

(Continued)

FOREIGN PATENT DOCUMENTS

CA 2259026 7/2000

OTHER PUBLICATIONS

Office Action, dated Oct. 1, 2013, for U.S. Appl. No. 13/466,935 (54.76), filed May 8, 2012, entitled "Multiple Project Areas in a Development Environment", invented by M.M. Attar et al., pp. 1-19.

(Continued)

*Primary Examiner* — Lewis A Bullock, Jr.
*Assistant Examiner* — Wynuel Aquino
(74) *Attorney, Agent, or Firm* — Janaki K. Davda; Konrad, Raynes, Davda and Victor LLP (57) ABSTRACT

Provided are a computer implemented method, computer program product, and system for partitioning a development environment. A development environment is divided into multiple project areas. Each of the multiple project areas is assigned to a different physical test environment. A solution is assigned to a project area among the multiple project areas. The solution is tested in the assigned physical test environment to modify the physical test environment. The physical test environment associated with the project area is re-initialized without re-initializing other physical test environments.

4 Claims, 7 Drawing Sheets

(56) References Cited

U.S. PATENT DOCUMENTS

| | | | |
|---|---|---|---|
| 7,958,488 B2 | 6/2011 | Cifra | |
| 2004/0187104 A1* | 9/2004 | Sardesai et al. | 717/174 |
| 2008/0256389 A1 | 10/2008 | Neethiraj et al. | |
| 2008/0263505 A1* | 10/2008 | StClair et al. | 717/101 |
| 2009/0006147 A1 | 1/2009 | Padmanabhan | |
| 2009/0119638 A1 | 5/2009 | Li et al. | |
| 2010/0100887 A1* | 4/2010 | Beltrand | 718/104 |
| 2010/0192220 A1 | 7/2010 | Heizmann et al. | |
| 2011/0083122 A1* | 4/2011 | Chen et al. | 717/124 |
| 2011/0088014 A1 | 4/2011 | Becker et al. | |
| 2011/0296523 A1* | 12/2011 | Schechter et al. | 726/21 |

OTHER PUBLICATIONS

Response to Office Action, dated Dec. 21, 2013, for U.S. Appl. No. 13/466,935 (54.76), filed May 8, 2012 entitled "Multiple Project Areas in a Development Environment", invented by M.M. Attar et al., pp. 1-11.

Cervantes, A., "Exploring the Use of a Test Automation Framework", 2009 IEEE Aerospace Conference, Mar. 7-14, 2009, 9 pp.

IBM Corporation, "Method for Merging Testing Environments of Heterogenous Components Designs", IP.com No. IPCOM000159244D, Oct. 15, 2007, 7 pp.

IBM Corporation, "Testing Estimation on Iterative Test Project", IP.com No. IPCOM000189413D, Nov. 9, 2009, 6 pp.

U.S Patent Application, dated May 8, 2012, for U.S. Appl. No. 13/466,935, filed May 8, 2012, entitled, "Multiple Project Areas in a Development Environment", invented by Mohammed M Attar et al., pp. 1-27.

Preliminary Amendment, dated May 14, 2013, for U.S. Appl. No. 13/466,935, filed May 8, 2012, entitled, "Multiple Project Areas in a Development Environment", invented by Mohammed M Attar et al., pp. 1-5.

Final Office Action, dated Mar. 27, 2014, for U.S. Appl. No. 13/466,935 (54.76), filed May 8, 2012, entitled "Multiple Project Areas in a Development Environment", invented by Mohammed M. Attar et al., Total 27 pages.

Response to Final Office Action, dated Jun. 27, 2014, for U.S. Appl. No. 13/466,935 (54.76), filed May 8, 2012, entitled "Multiple Project Areas in a Development Environment", invented by Mohammed M. Attar et al., Total 10 pages.

Office Action, dated Sep. 3, 2014, for U.S. Appl. No. 13/466,935 (54.76) filed May 8, 2012, invented by Mohammed M. Attar et al., Total 27 pages.

Response to Office Action, dated Nov. 24, 2014, for U.S. Appl. No. 13/466,935 (54.76) filed May 8, 2012, invented by Mohammed M. Attar et al., Total 10 pages.

Notice of Allowance, dated Feb. 11, 2015, for U.S. Appl. No. 13/466,935 (54.76) filed May 8, 2012, invented by Mohammed M. Attar et al., Total 11 pages.

* cited by examiner

MULTIPLE PROJECT AREAS IN A DEVELOPMENT ENVIRONMENT

CROSS-REFERENCE TO RELATED APPLICATION

This patent application is a continuation of U.S. patent application Ser. No. 13/466,935, filed May 8, 2012, which patent application is incorporated herein by reference in its entirety.

FIELD

Embodiments of the invention relate to multiple project areas in a development environment.

BACKGROUND

A solution may be described as a custom application that is run on a portal server. A developer (e.g., a business analyst or solution developer) may create (i.e., develop) a solution in a development environment (e.g., a set of computing devices and resources). Once the developer thinks the solution is ready, the developer deploys the solution to a physical test environment (which is a part of the development environment) and tests the solution to determine whether the solution works as desired. Deployment includes creating classes and objects defined in the solution. The physical test environment is similar to a target environment in which the solution will eventually execute. If the solution works as desired, the product is copied to an acceptance physical test environment in which a customer tests the solution. If the customer accepts the solution, the solution is copied to a production environment, making the solution available to all users of the system.

A developer that is working on a solution in a development environment deploys the solution to the same physical test environment used by all other developers on the same development environment. Also, upon re-initialization (i.e., resetting) of the physical test environment, a developer re-initializes the physical test environment for all developers.

A developer needs to be able to have a clean physical test environment to test out the solution. Therefore, developers currently have to coordinate with each other on which versions of a solution are to be deployed and when the physical test environment is to be re-initialized.

SUMMARY

Provided are a computer implemented method, computer program product, and system for partitioning a development environment. A development environment is divided into multiple project areas. Each of the multiple project areas is assigned to a different physical test environment. A solution is assigned to a project area among the multiple project areas. The solution is tested in the assigned physical test environment to modify the physical test environment. The physical test environment associated with the project area is re-initialized without re-initializing other physical test environments.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
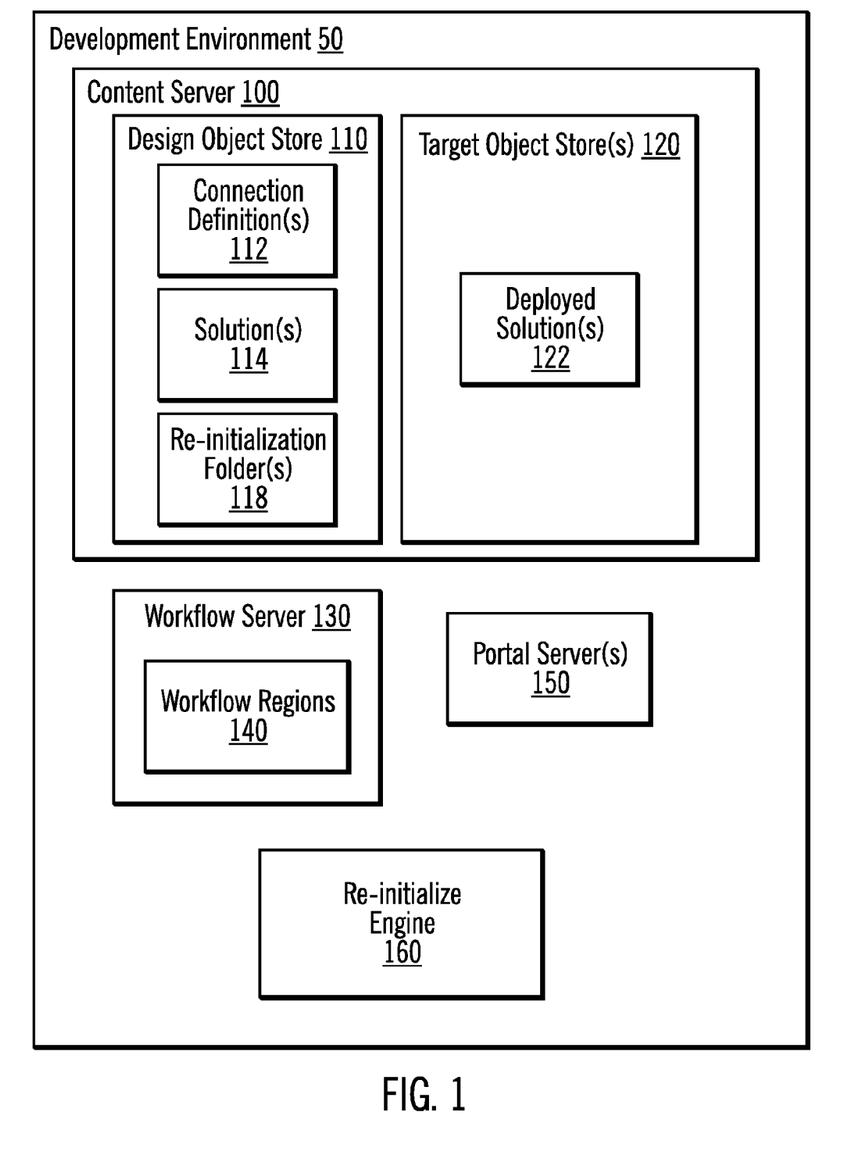
FIG. 1 illustrates, in a block diagram, a computing environment in accordance with certain embodiments.

FIG. 1 illustrates, in a block diagram, a computing environment in accordance with certain embodiments. A development environment 50 includes a content server 100, a workflow server 130, one or more portal servers 150, and a re-initialize engine 160. The content server 100 includes a design object store 110 and one or more target object stores 120. The design object store 110 includes one or more connection definitions 112, one or more solutions 114, and one or more and re-initialization folders 118. The workflow server 130 includes workflow regions 140. In certain embodiments, the portal servers 150 are mashup servers. In certain embodiments, the connection definitions are checked into the design object store 110. Each target object store 120 includes one or more deployed solutions 122. In certain embodiments, there is a workflow region 140 for each target object store 120. In certain embodiments, connection definitions 112 may be described as stand-ins for project areas. In certain embodiments, a deployed solution 122 is read by the portal server 150 in combination with the workflow region 140.

In various embodiments, the content server 100, the workflow server 130, and the portal servers 150 may be on a same physical server or may be on different servers in different combinations.

A project area may be described as a virtual object that depicts the project area concept. The project area is logically equivalent to a connection definition 112.

Each project area includes: a connection definition 112, a set of one or more solutions 114, a re-initialization folder 118, a target object store 120, a workflow region 140, and a portal server 150.

In certain embodiments, each project area has one connection definition 112, which is a document object in the content server 100. The connection definition serves as a security proxy for the solution folder (which contains the solution 114) and re-initialization artifacts (stored in the re-initialization folders 118), so that security settings may be set on the connection definition and inherited by these other objects. The connection definition 112 contains a workflow server connection point that specifies a workflow region 140. A workflow region 140 is associated with a target object store 120 for a project area. The connection definition 112 also identifies a portal server 150. In certain embodiments, the connection definition 112 contains a physical Identifier (ID) and Uniform Resource Locator (URL) to track the portal server 150 to which solutions 114 are to be deployed, as well as, a list of logical page to physical page mappings for deployed solutions 114 in the project area. Since a connection definition may exist both in a development environment (associated with a project area) and a production environment (associated with no project area), the connection definition also has a property to indicate whether the connection definition is for a production environment or a development environment.

Solutions 114 are persisted in a design object store 110, with each solution 114 and its associated objects stored in a solution folder. In certain embodiments, the solution folder has the same name as the associated solution 114. In certain embodiments, a solution folder is an object derived from a folder class in the content server 100. The solution folder has a singleton object value property pointing to the version series object of the connection definition 112 for the project area to which the solution 114 belongs. This allows for the solution 114 and the solution folder (storing the re-initialization artifacts) to inherit the security settings of the connection definition 112 for the project area. Workflow definitions may be a part of the solution 114 and are contained in the solution definition. The workflow definitions define workflows.

The design object store 110 contains a re-initialization folder 118 for each project area. In certain embodiments, the re-initialization folder name has the same name as the associated project area name. In certain embodiments, the re-initialization folder 118 is a folder of the class ReinitArtifacts, derived from a folder class in the content server 100. The re-initialization folder 118 stores artifacts required for re-initialization of the project area's target object store 120, workflow region 140, and portal server 150. These artifacts include, for example, the code module for the target object store 120, a metadata list for the target object store 120, and a re-initialization status object. The re-initialization folder 118 has a singleton object value property pointing to the version series object of the connection definition 112 for the project area to which the re-initialization folder 118 belongs. The metadata list for the target object store 120 may be described as a bundle of metadata (e.g., class and property definitions).

A target object store 120 for a project area contains solution metadata and objects for the deployed solutions of a project area. It is associated with a workflow region 140, which is pointed to by the workflow server connection point stored in the connection definition 112. Each project area has its own target object store 120.

A workflow region 140 for a project area contains configuration and work items for the deployed solutions 114 of a project area. The workflow region is associated with one target object store 120. Each project area has its own workflow region 140.

A portal server 150 contains page layouts for a deployed solution 114 and is used to run one or more solutions 112. Each project area may have its own portal server 140, or multiple project areas may share the same portal server 150.

The connection definition 112 serves as the physical representation of the project area. The project area serves as a concept that contains a connection definition 112. Security settings are set on the connection definition 112 and are inherited by the solutions and the re-initialization artifacts for the project area via the object value property for the solution folder and the re-initialization folder 118.

Each project area is associated with a different physical test environment. When the re-initialize engine 160 re-initializes a physical test environment for a project area, the re-initializing does not affect other project areas and other physical test environments. In certain embodiments, re-initializing the project area includes re-initializing the target object store 120, the workflow region 140, and the portal server 150 to original (e.g., default) settings. In certain embodiments, the target object store 120 and workflow region 140 will be reset to a completely clean setting. It will be as if the user had just created them again.

Figure 2:
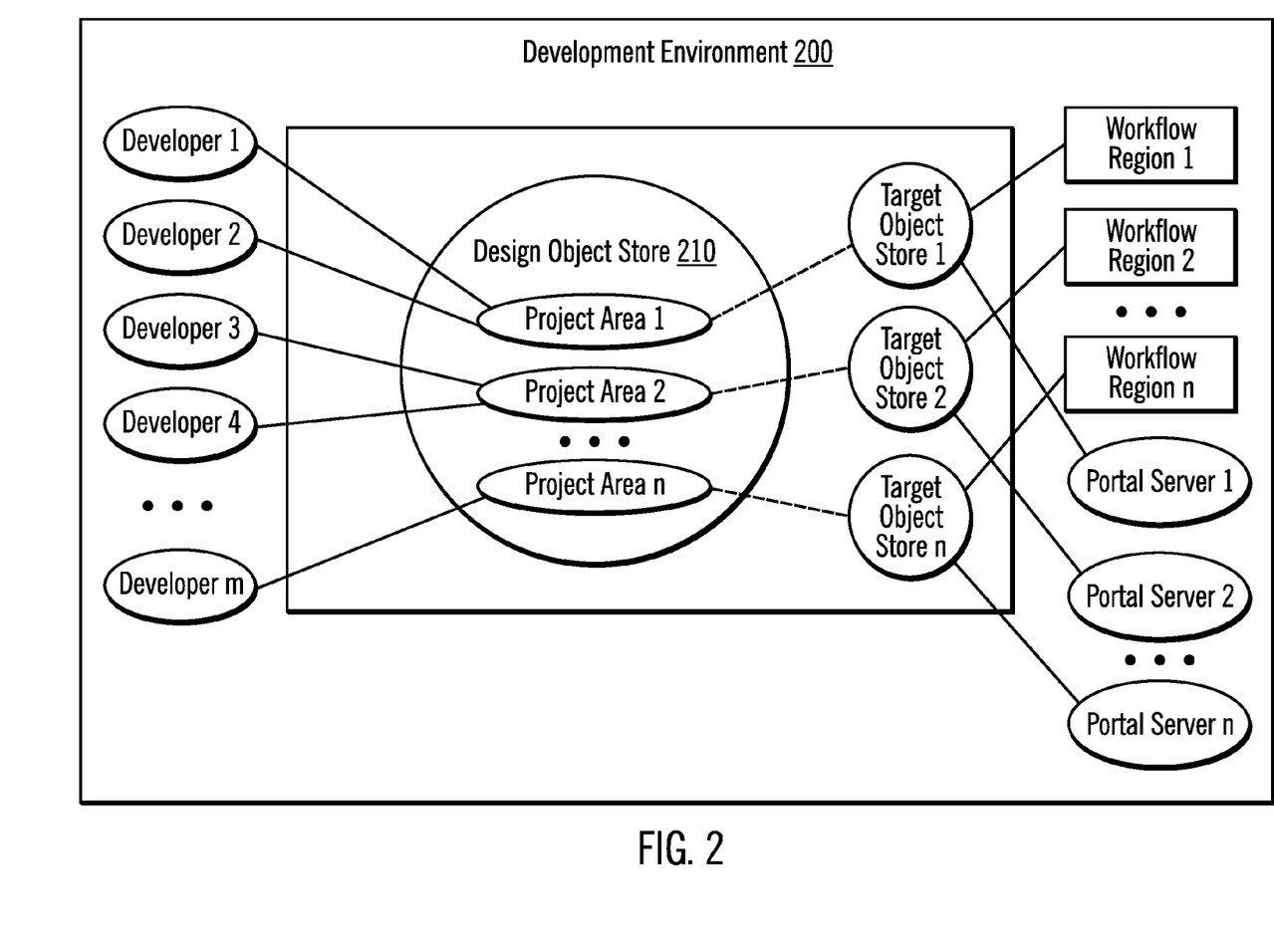
FIG. 2 illustrates multiple project areas in a development environment in accordance with certain embodiments.

FIG. 2 illustrates multiple project areas in a development environment 200 in accordance with certain embodiments. The development environment 200 is carved up into project areas (i.e., project area 1, project area 2, . . . project area n), which are controlled by an administrator. A single design object store 210 has multiple project areas, and each project area corresponds to one physical test environment.

Each developer (e.g., a business analyst) is assigned one or more project areas by the administrator. The project area corresponds to one physical test environment. Multiple developers may share the same project area, and there may be multiple solutions being developed in a project area. For example, in FIG. 2, developer 1 is assigned to project area 1, developer 2 is assigned to project area 1, developer 3 is assigned to project area 2, developer 4 is assigned to project area 2, and developer m is assigned to project area n.

There is at least one object store associated with each project area. For example, in FIG. 2, project area 1 is associated with target object store 1, project area 2 is associated with target object store 2, and project area n is associated with target object store n.

Each target object store is associated with at least one workflow region and at least one portal server. For example, target object store 1 is associated with workflow region 1 and portal server 1, target object store 2 is associated with workflow region 2 and portal server 2 and target object store n is associated with workflow region n and portal server n. In certain embodiments, multiple target object stores may use the same portal server.

Figure 3:
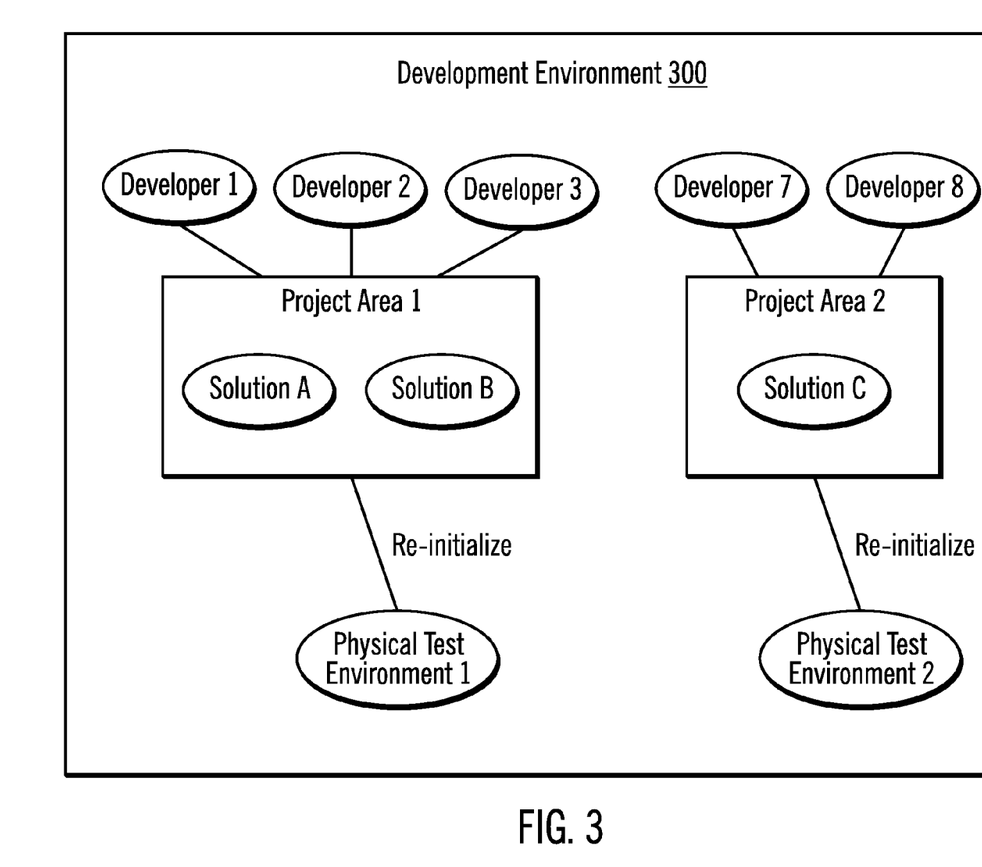
FIG. 3 illustrates project areas and solutions in a development environment in accordance with certain embodiments.

FIG. 3 illustrates project areas and solutions in a development environment 300 in accordance with certain embodiments. Developer 1, developer 2, and developer 3 are assigned to project area 1 to work on solution A and solution B. Developer 7 and developer 8 are assigned to project area 2 to work on solution C. Project area 1 is associated with physical test environment 1, while project area 2 is associated with physical test environment 2. When the re-initialize engine 160 re-initializes physical test environment 1 associated with project area 1, the re-initialization does not affect project area 2. Likewise, when the re-initialize engine 160 re-initializes physical test environment 2 associated with project area 2, the re-initialization does not impact project area 1. In certain embodiments, each solution is associated with a Solution Definition File (SDF) (which is an artifact that defines a solution (e.g., an Extensible Markup Language (XML) file)), a workflow server configuration, an eXtensible Markup Language (XML) Process Definition Language (XPDL), pages, and other assets. In certain embodiments, each solution may also be associated with form templates (defining forms for users to fill in), search templates (defining queries that can be done for the user), and other items.

Figure 4:
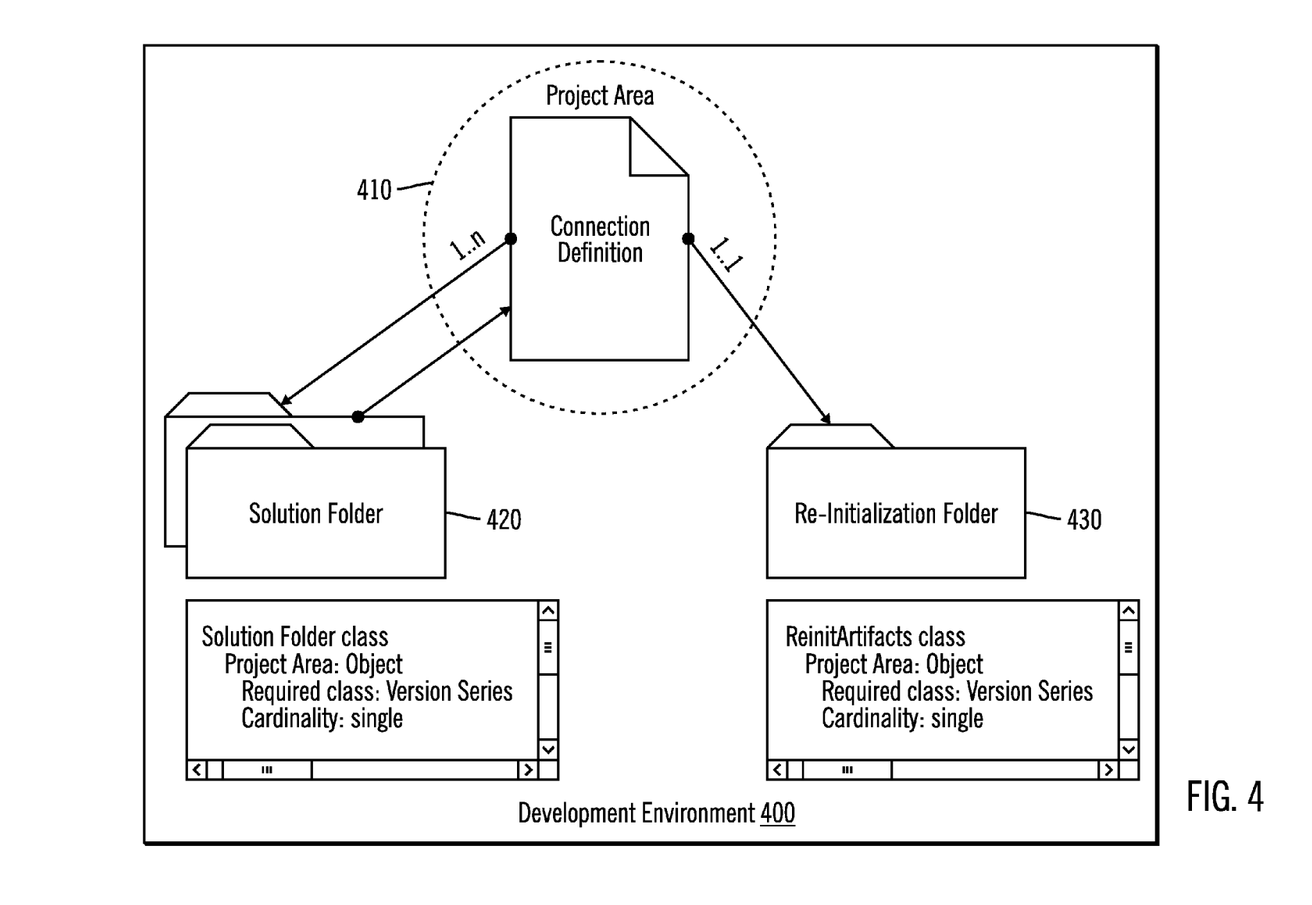
FIG. 4 illustrates elements of a project area in a development environment in accordance with certain embodiments.

FIG. 4 illustrates elements of a project area 410 in a development environment 400 in accordance with certain embodiments. The project area 410 is associated with solution folders 420 and a re-initialization folder 430. In certain embodiments a solution folder contains one solution. In certain embodiments, a solution folder's property tracks the project area to which the contained solution belongs. In particular, FIG. 4 illustrates the relationship of N solutions (one in each solution folder 420) and one re-initialization folder 430 belonging to a project area.

Figure 5:
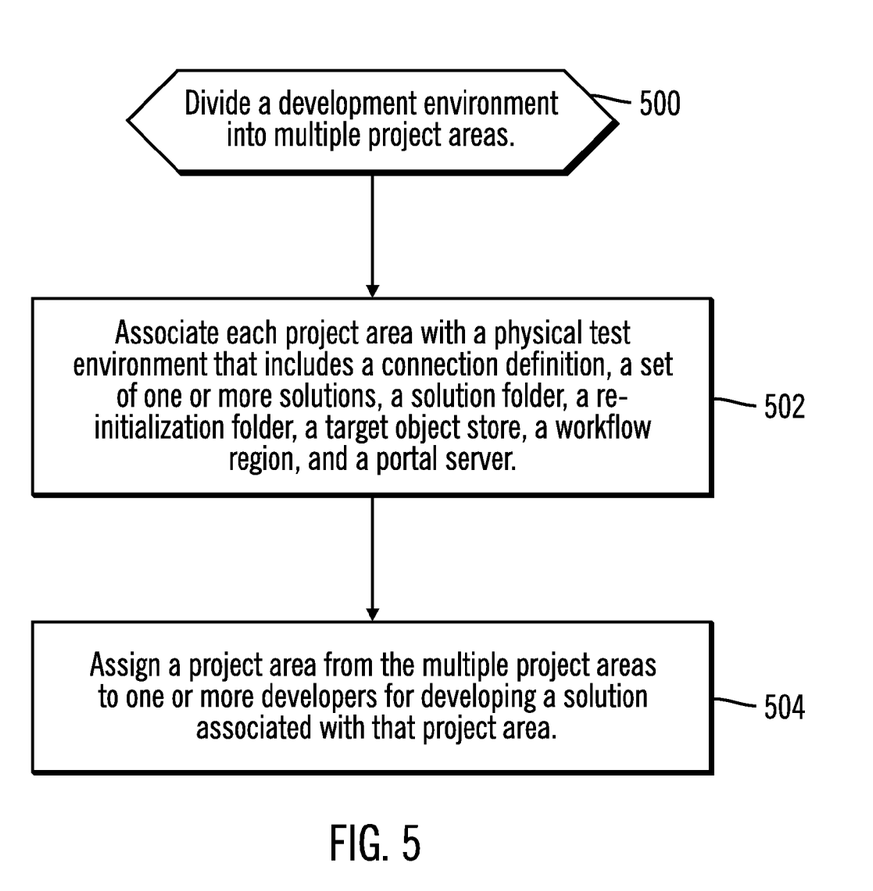
FIG. 5 illustrates, in a flow diagram, operations performed to create multiple project areas in a single development environment in accordance with certain embodiments.

FIG. 5 illustrates, in a flow diagram, operations performed to create multiple project areas in a single development environment in accordance with certain embodiments. Control begins at block 500 with an administrator dividing a development environment into multiple project areas. In block 502, the administrator associates each project area with a physical test environment that includes a connection definition 112, a set of one or more solutions 114, a re-initialization folder 118, a target object store 120, a workflow region 140, and a portal server 150. In block 504, the administrator assigns a project area from the multiple project areas to one or more developers for developing a solution associated with that project area.

Figure 6:
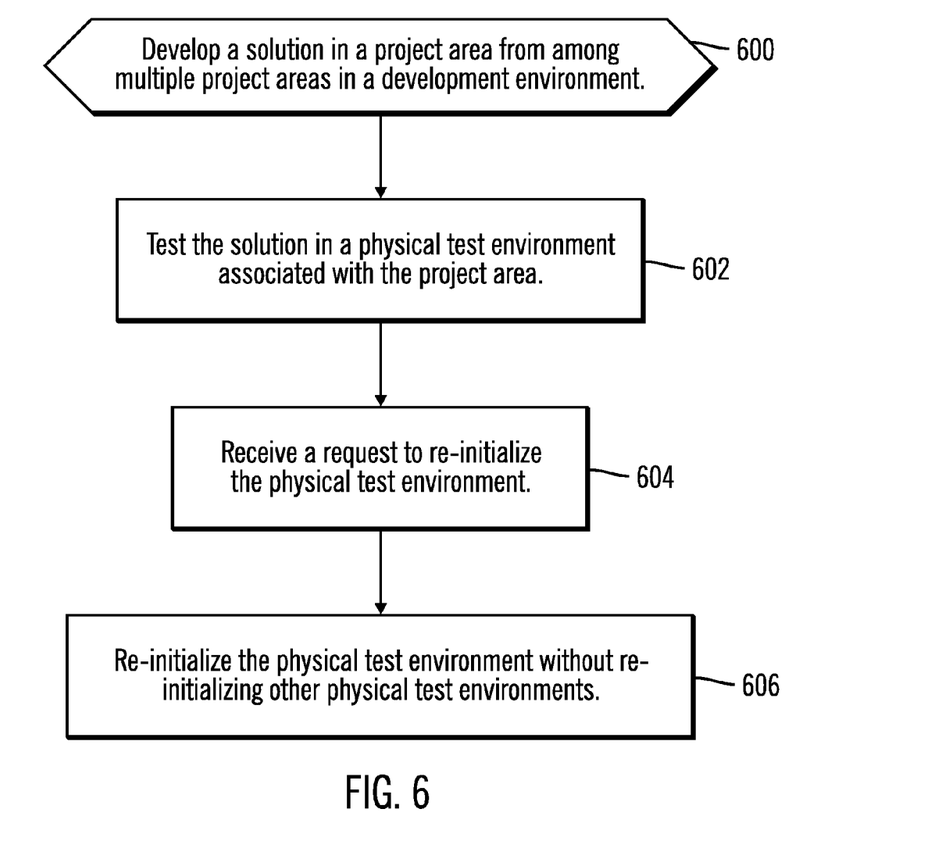
FIG. 6 illustrates, in a flow diagram, operations performed to re-initialize a physical test environment in accordance with certain embodiments.

FIG. 6 illustrates, in a flow diagram, operations performed to re-initialize a physical test environment in accordance with certain embodiments. Control begins at block 600 with a developer developing a solution in a project area from among multiple project areas in the development environment. In block 602, the developer tests the solution in a physical test environment associated with the project area. In block 604, the re-initialize engine 160 receives a request to re-initialize the physical test environment (e.g., from a developer). In block 606, the re-initialize engine 160 re-initializes the physical test environment without re-initializing other physical test environments.

With the introduction of multiple project areas in a development environment, solutions 114 and developers are partitioned off into separate project areas, giving developers better control of their solutions 114 and physical test environments. Each developer is assigned to a project area, with each solution 114 in the development environment also assigned to a project area. In certain embodiments, a solution 114 can only belong to a single project area, but a project area may have multiple solutions 114. An administrator takes care of creation and configuration of a project area, assigning solutions and users to the project area, creating and configuring physical test environments, and assigning the physical test environments to project areas. A developer does not need to know the details of how the physical test environment is configured, as this is handled by the administrator. This simplifies the work the developer has to do, so that they can concentrate on creating their solutions.

When the developer wishes to deploy a solution, the developer does not need to coordinate with others (unless he/she is sharing the project area with other developers). The same thing goes with re-initializing the project area's physical test environment. This allows the developer to not worry about erasing the work of developers working on other solutions.

Embodiments support iterative solution development for multiple developers to build, deploy, and test multiple solutions.

Embodiments enable complex solutions to be developed and deployed. Embodiments manage the situation in which a solution is deployed with an initial state, and where that state would otherwise over-write the state of other solutions or developers that are sharing some of the same resources. Embodiments do not require complete, dedicated systems of multiple servers/service instances for each developer. Embodiments may be implemented in development environments that combine ("mash up") different services to provide a complete offering (e.g., combining process, content, and other services to create a case management solution).

Thus, embodiments partition a development environment into multiple test environments.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 7:
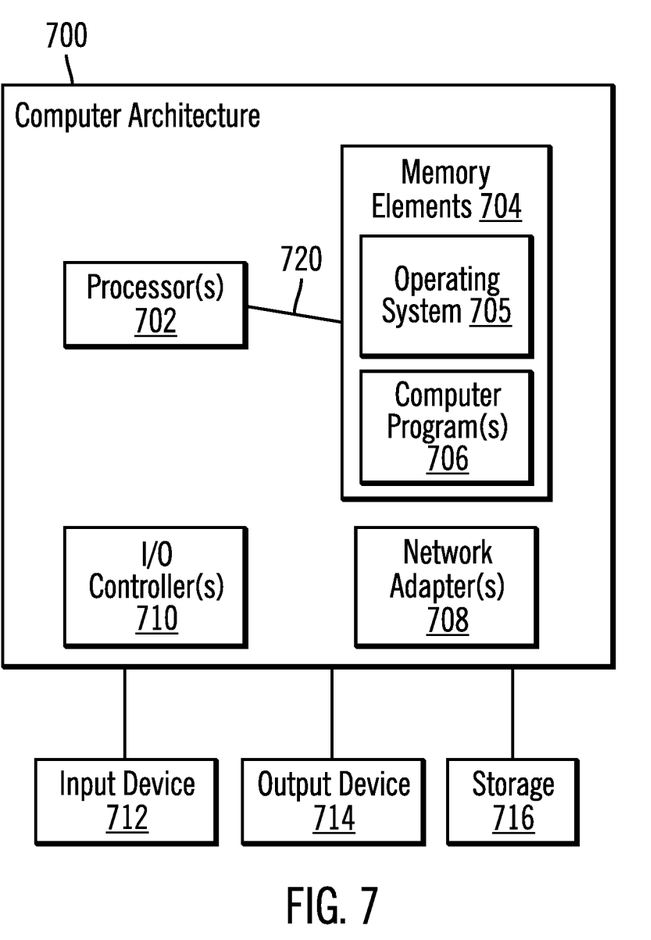
FIG. 7 illustrates, in a block diagram, a computer architecture that may be used in accordance with certain embodiments.

FIG. 7 illustrates a computer architecture 700 that may be used in accordance with certain embodiments. Content server 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., any type of storage device; a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for partitioning a development environment, comprising:
dividing, using a processor of a computer, a development environment into multiple project areas;
assigning a project area of the multiple project areas to a different physical test environment and to a target object store that stores one or more deployed solutions;
providing the project area with a connection definition 1) that identifies a workflow region for storing configuration and work items for the one or more deployed solutions, 2) that identifies a portal server that is used for running the one or more deployed solutions, 3) that is associated with a solution folder for a solution, and 4) that is associated with a re-initialization folder that contains artifacts for re-initialization of the target object store, the workflow region, and the portal server;
associating the target object store with the workflow region and the portal server;
testing the solution in the assigned physical test environment to modify the assigned physical test environment; and
re-initializing the assigned physical test environment associated with the project area without re-initializing other physical test environments by re-initializing the target object store, the workflow region, and the portal server to default settings using the artifacts contained in the re-initialization folder.

2. The method of claim 1, wherein multiple solutions are assigned to the project area.

3. The method of claim 1, wherein each different physical test environment includes the solution folder that inherits security settings of the connection definition, and the re-initialization folder that inherits the security settings of the connection definition.

4. The method of claim 1, wherein the project area has one connection definition comprising a document object, wherein the connection definition serves as a security proxy for a solution folder containing the solution and for the re-initialization folder containing the artifacts, and wherein security settings set on the connection definition are inherited by other objects.

* * * * *